United States Patent
Zhong et al.

(10) Patent No.: US 11,264,619 B1
(45) Date of Patent: Mar. 1, 2022

(54) MATRIX MATERIAL FOR THE GAS DIFFUSION LAYER OF THE POLYMER ELECTROLYTE MEMBRANE FUEL CELL

(71) Applicant: National Engineering Research Center of Advanced Energy Storage Materials (Shenzhen) Co., Ltd, Shenzhen (CN)

(72) Inventors: Faping Zhong, Shenzhen (CN); Jinchun Xiao, Shenzhen (CN); Jianqi Li, Shenzhen (CN); Changping Fu, Shenzhen (CN); Xiaobing Huang, Shenzhen (CN)

(73) Assignee: NATIONAL ENGINEERING RESEARCH CENTER OF ADVANCED ENERGY STORAGE MATERIALS (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 17/341,266

(22) Filed: Jun. 7, 2021

(30) Foreign Application Priority Data

May 13, 2021 (CN) .......................... 202110523962.5

(51) Int. Cl.
*H01M 4/86* (2006.01)
*C25D 3/54* (2006.01)
*C25D 3/12* (2006.01)

(52) U.S. Cl.
CPC ............ *H01M 4/8621* (2013.01); *C25D 3/12* (2013.01); *C25D 3/54* (2013.01); *H01M 2004/8689* (2013.01)

(58) Field of Classification Search
CPC ........ H01M 4/8621; H01M 2004/8689; C25D 3/12; C25D 3/54
See application file for complete search history.

(56) References Cited

U.S. PATENT DOCUMENTS

2014/0017582 A1 * 1/2014 Hashimoto ........... H01M 8/241
429/414

* cited by examiner

*Primary Examiner* — Lingwen R Zeng
(74) *Attorney, Agent, or Firm* — Getech Law LLC; Jun Ye

(57) ABSTRACT

The invention provides a matrix material for the gas diffusion layer of the polymer electrolyte membrane fuel cell, which is composed of three-dimensional porous and strip-shaped hexagonal chambers connected to each other, wherein the six-sided ribs are composed of two metal layers, the inside is metal nickel, and the outside is tungsten-nickel alloy. The total mass of metal per square meter of the material is: 1500~3000 grams, the mass content of metal nickel in the material is 88~92%, the mass content of metal tungsten is 8~12%, and the rest are impurities; the thickness of the matrix material is 0.1~0.2 mm, specific surface area is $(1~2)\times10^5$ m$^2$/m$^3$; longitudinal air permeability ≥2000 m/mm/(cm$^2$hmmAq), longitudinal thermal conductivity ≥1.7W/(m·k), transverse thermal conductivity ≥21W/(m·K). The porous nickel-tungsten metal material of the invention, as the matrix material of the gas diffusion layer, has the advantages of lower electrical resistance and higher strength compared with carbon paper.

5 Claims, 1 Drawing Sheet

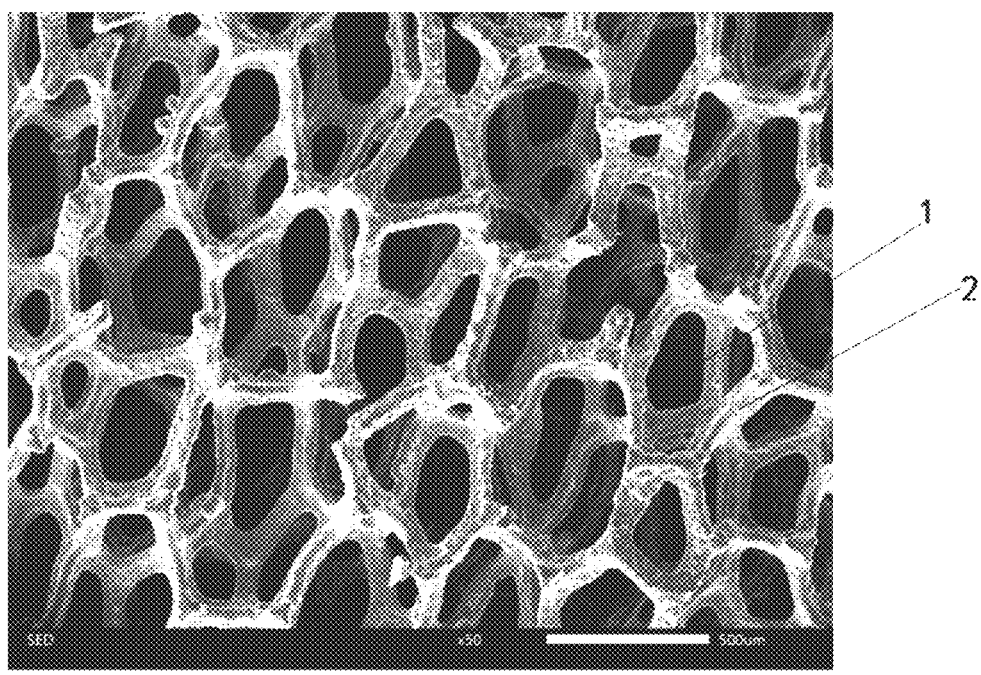

MATRIX MATERIAL FOR THE GAS DIFFUSION LAYER OF THE POLYMER ELECTROLYTE MEMBRANE FUEL CELL

TECHNICAL FIELD

The invention relates to a material for the polymer electrolyte membrane fuel cell, in particular to a matrix material for the gas diffusion layer of the polymer electrolyte membrane fuel cell.

BACKGROUND

Carbon fiber paper or carbon fiber cloth is commonly used as the matrix material of the gas diffusion layer of the polymer electrolyte membrane fuel cell. Carbon fiber cloth and carbon fiber paper are characterized by lightness and large porosity, they are mainly monopolized by manufacturers such as Toray (Japan) and Ballard (Canada). However, the thermal conductivity, electrical resistance, strength and other properties of carbon fiber paper and carbon fiber cloth still cannot meet the continuous improvement requirements of polymer electrolyte membrane fuel cells. It is necessary to find a suitable material to replace carbon fiber paper or carbon fiber cloth.

SUMMARY

The invention aims to provide a matrix material for the gas diffusion layer of the polymer electrolyte membrane fuel cell that can significantly improve thermal conductivity and strength performance. The invention is realized through the following schemes:

A matrix material for the gas diffusion layer of the polymer electrolyte membrane fuel cell, which is composed of three-dimensional porous and strip-shaped hexagonal chambers connected to each other, wherein the six-sided ribs are composed of two metal layers, the inside is metal nickel, and the outside is tungsten-nickel alloy. The total mass of metal per square meter of the material is: 1500~3000 grams, the mass content of metal nickel in the material is 88~92%, the mass content of metal tungsten is 8~12%, and the rest are impurities; the thickness of the matrix material is 0.1~0.2 mm, specific surface area is $(1~2) \times 10^5$ m$^2$/m$^3$; 0<material longitudinal resistivity ≤55 mΩ·cm, 0<material sheet resistivity ≤4 mΩ·cm, 0<material contact resistance ≤5 mΩ·cm; material tensile strength is ≥25 Mpa.

The longitudinal air permeability of the matrix material is ≥2000 m/mm/(cm$^2$hmmAq), the longitudinal thermal conductivity is ≥1.7 W/(m·k), and the transverse thermal conductivity is ≥21W/(m·k). The above referred longitudinal direction refers to the direction perpendicular to the surface of the strip-shaped material, and the referred transverse direction refers to the direction parallel to the surface of the strip-shaped material. The material is used as the positive electrode, the calomel electrode is used as the negative electrode, the sodium chloride aqueous solution is used as the electrolyte, with an applied potential of 1.45V for 75h, the weight loss rate of the material is ≤5%.

After the material is soaked in 4% $H_2O_2$ for 160h and then dried to reach a constant weight, the weight loss rate of the material is ≤5%.

The preparation method of the matrix material is as follows: first, the existing porous nickel strip is rolled and then placed in the nickel electroplating solution. The nickel electroplating can be treated by Watt nickel plating solution in the prior art. The porous nickel strip is used as anode and nickel metal is used as cathode for electrolysis treatment for 10~60 min, where the temperature of nickel electroplating solution is 30° C. and the current density of electroplating is 10~30 A/m$^2$. The porous nickel strip treated by the above electrolysis is then heat-treated at 800~1000° C. with a reducing atmosphere for a certain period of time, which is based on the treatment of 10~20 minutes per square meter of material, and the porous nickel strip after heat treatment is plated by the existing composite tungsten electroplating process, and then heat-treated at 800~1000° C. with a reducing atmosphere for a certain period of time, which is based on the treatment of 10~60 minutes per square meter of material, The porous nickel tungsten strip is finally rolled to 0.1~0.2 mm after heat treatment.

A gas diffusion layer for the polymer electrolyte membrane fuel cell is covered with a microporous layer containing carbon powder on one side of the above-mentioned matrix material. Using the above-mentioned matrix material to replace the carbon paper in the prior art, the gas diffusion layer for polymer electrolyte membrane fuel cell can be prepared by using the preparation process of the existing gas diffusion layer. Compared with the prior art, the advantages of the invention are:

1. The porous nickel-tungsten metal material of the invention, as the matrix material of the gas diffusion layer, has the advantages of lower resistance and higher strength compared with carbon paper.
2. The porous nickel-tungsten metal material of the invention has a porosity of more than 75%, high specific surface area, excellent thermal conductivity and gas permeability performance, and is suitable for the matrix material as a gas diffusion layer.
3. The porous nickel-tungsten metal material of the invention, wherein, the content of the metal nickel and the metal tungsten, and the two-layered internal structure of the metal make the material have better resistance to electrical corrosion, after preparing the diffusion layer, because the diffusion layer is closely connected with the electrode of the fuel cell, it can effectively resist the electrochemical corrosion caused by electrochemical reaction to the diffusion layer.
4. Since the gas diffusion layer is mainly used for the passage of hydrogen and oxygen, in order to prolong the service life of fuel cells, it is also required to have good oxidation resistance. The specific content of nickel and tungsten and the metal layered internal structure of the matrix material also have better oxidation resistance.

BRIEF DESCRIPTION OF THE DRAWINGS

FIG. 1 SEM image of material in embodiment 2

DETAILED DESCRIPTION

Embodiment 1

Firstly, a porous nickel strip with a thickness of 1.0 mm and 2650 grams of metal nickel per square meter is rolled to 0.5 mm, and then placed in a Watt nickel electroplating solution, with the porous nickel strip as the anode and nickel metal as the cathode, being electrolysis treated for 35 minutes, wherein the temperature of the electroplating nickel solution is 30° C., and the electroplating current density is 30 A/m$^2$; then the electrolysis-treated porous nickel strip is heat-treated in an environment of 800~1000° C. with a reducing atmosphere for a certain period of time. The time is based on 15 minutes per square meter of material processing. After heat treatment, the porous nickel strip is placed in the following composite tungsten electroplating solution for 15 minutes; and then heat treated in a 900° C. environment with a reducing atmosphere for a certain period of time, the time is based on 40 minutes per square meter of material processing; finally, the heat-treated porous nickel-tungsten metal strip is rolled to 0.1 mm. The composite tungsten electroplating solution used above is the concentration of sodium tungstate is 80 g/L, the concentration of triamine citrate is 30 g/L, the concentration of nickel sulfate is 50 g/L, the pH value of the tungsten electroplating solution is controlled as 6.5, the temperature is 55° C. and the electroplating current density is 25 A/dm².

Embodiment 2

A matrix material for the gas diffusion layer of a polymer electrolyte membrane fuel cell was prepared by the method of Embodiment 1. The scanning electron microscope is shown in FIG. 1. The matrix material is composed of three-dimensional porous and strip-shaped hexagonal chambers 1 connected to each other, wherein the six-sided ribs 2 are composed of two metal layers, the inside is metal nickel, and the outside is tungsten-nickel alloy. The total mass of metal per square meter of material is 1670 grams, the mass content of metal nickel in the material is 89%, the mass content of metal tungsten is 10.5%, and the rest are impurities; the thickness of the matrix material is 0.1 mm, and the specific surface area is $1.5 \times 10^5$ m²/m³; the porosity of the material is 82%, longitudinal air permeability is 2300 m/mm/(cm²hmmAq), longitudinal resistivity is 30 mΩ·cm, sheet resistivity is 2.1 mΩ·cm, contact resistivity is 3 mΩ·cm; the tensile strength of the material is 75 Mpa; the longitudinal thermal conductivity of the material is 1.95 W/(m·k), and the transverse thermal conductivity is 23 W/(m·k). The above material is used as the positive electrode, the calomel electrode is used as the negative electrode, the sodium chloride aqueous solution is used as the electrolyte, and the applied potential of 1.45V is used for 75h, and the weight loss rate of the material is 3.5%. After the material is soaked in 4% $H_2O_2$ for 160 hours and then dried to reach a constant weight, the weight loss rate of the material is 3.85%.

Embodiment 3

Firstly, a porous nickel strip with a thickness of 1.0 mm and 2400 grams of metal nickel per square meter is rolled to 0.5 mm, and then placed in a Watt nickel electroplating solution, with the porous nickel strip as the anode and nickel metal as the cathode, Electrolytic treatment is carried out for 45 minutes, wherein the temperature of the electroplating nickel solution is 30° C., and the electroplating current density is 25 A/dm²; after that, the porous nickel strip is heat-treated in an environment of 800° C. with a reducing atmosphere for a certain period of time. The time is based on 55 minutes per square meter of material. The heat-treated porous nickel strip is placed in the following electroplating tungsten bath for 10 minutes; then heat-treated for a certain period of time in a 1000° C. environment with a reducing atmosphere, the time is based on 10 minutes per square meter of material; finally, the heat-treated porous nickel-tungsten metal strip is rolled to 0.1 mm. The tungsten electroplating solution used above is the concentration of sodium tungstate is 80 g/L, the concentration of triamine citrate is 30 g/L, the pH value of the tungsten electroplating solution is controlled as 6.5, the temperature is 55° C., and the electroplating current density is 20 A/dm².

Embodiment 4

A matrix material for the gas diffusion layer of polymer electrolyte membrane fuel cell was prepared by embodiment 3, the scanning electron microscope is shown in FIG. 1. The matrix material is composed of three-dimensional porous and strip-shaped hexagonal chambers 1 connected to each other, wherein the six-sided ribs 2 are composed of two metal layers, the inside is metal nickel, and the outside is tungsten-nickel alloy. The total mass of metal per square meter of material is: 2270 grams, the mass content of metal nickel in the material is 91%, the mass content of metal tungsten is 8.9%, and the rest are impurities; the thickness of the matrix material is 0.2 mm, and the specific surface area is $1.87 \times 10^5$ m²/m³; porosity of the material is 85%, longitudinal air permeability is 2480 m/mm/(cm²hmmAq), longitudinal resistivity is 36 mΩ·cm, sheet resistivity is 31 mΩ·cm, contact resistivity is 3.6 mΩ·cm, the tensile strength of the material is 65 Mpa; the longitudinal thermal conductivity of the material is 2.1 W/(m·k), and the transverse thermal conductivity is 25 W/(m·k). The above-mentioned material is used as the positive electrode, the calomel electrode is used as the negative electrode, and the sodium chloride aqueous solution is used as the electrolyte. The applied potential of 1.45V is used for 75h, and the weight loss rate of the material is 4%. After the material was soaked in 4% $H_2O_2$ for 160 hours and then dried to reach a constant weight, the weight loss rate of the material is 3.2%.

What is claimed:

1. A matrix material for the gas diffusion layer of the polymer electrolyte membrane fuel cell, the matrix material is composed of three-dimensional porous and strip-shaped hexagonal chambers connected to each other, wherein the six-sided ribs are composed of two metal layers, the inside is metal nickel, and the outside is tungsten-nickel alloy. The total mass of metal per square meter of the material is: 1500~3000 grams, the mass content of metal nickel in the material is 88~92%, the mass content of metal tungsten is 8~12%, and the rest are impurities; the thickness of the matrix material is 0.1~0.2 mm, specific surface area is $(1~2) \times 10^5$ m2/m3; 0<material longitudinal resistivity ≤55 mΩ·cm, 0<material sheet resistivity ≤4 mΩ·cm, 0<material contact resistance ≤5 mΩ·cm; material tensile strength is ≥25 Mpa.

2. The matrix material of claim 1, wherein the longitudinal air permeability of the material ≥2000 m/mm/(cm2hmmAq), and the longitudinal thermal conductivity is ≥1.7 W/(m·k), transverse thermal conductivity is ≥21W/(m·k).

3. The matrix material of claim 1, wherein the material as the positive electrode, the calomel electrode as the negative electrode, the sodium chloride aqueous solution as the electrolyte, with an applied potential of 1.45V for 75h, the weight loss rate of the material is ≤5%.

4. The matrix material of claim 1, wherein after the material being soaked in 4% H2O2 for 160h and then dried to reach a constant weight, the weight loss rate is ≤5%.

5. The matrix material of claim 3, wherein, after the material being soaked in 4% H2O2 for 160h and then dried to reach a constant weight, the weight loss rate is ≤5%.

* * * * *